United States Patent
Starkovich et al.

(10) Patent No.: US 6,212,546 B1
(45) Date of Patent: Apr. 3, 2001

(54) PROVIDING A MODULAR GATEWAY ARCHITECTURE WHICH ISOLATES ATTRIBUTES OF THE CLIENT AND SERVER SYSTEMS INTO INDEPENDENT COMPONENTS

(75) Inventors: Daniel P. Starkovich, Brooklyn Park; Robert J. Gambrel, Spring Lake Park, both of MN (US)

(73) Assignee: Unisys Corporation, Blue Bell, PA (US)

(*) Notice: Subject to any disclaimer, the term of this patent is extended or adjusted under 35 U.S.C. 154(b) by 0 days.

(21) Appl. No.: 09/164,933

(22) Filed: Oct. 1, 1998

(51) Int. Cl.[7] .................................................. G06F 15/16
(52) U.S. Cl. ..................... 709/203; 704/201; 704/202; 704/217; 704/219; 704/223; 704/228; 713/200; 707/10; 707/104; 707/201
(58) Field of Search ................................. 709/200–203, 709/217, 219, 223–230; 713/200–201; 707/1, 10, 104, 200–204, 513

(56) References Cited

U.S. PATENT DOCUMENTS

| | | | |
|---|---|---|---|
| 5,724,424 | 3/1998 | Gifford | 380/24 |
| 5,857,201 * | 1/1999 | Wright, Jr. et al. | 707/104 |
| 5,875,306 * | 2/1999 | Bereiter | 709/220 |
| 6,014,134 * | 1/2000 | Bell et al. | 709/203 |
| 6,061,796 * | 5/2000 | Chen et al. | 713/200 |

OTHER PUBLICATIONS

Jon G. Auerbach, "Open Market Inc. Says It Will Receive Patents for Internet–Commerce Software," *Wall Street Journal*, Mar. 3, 1998, p. 36.

* cited by examiner

*Primary Examiner*—Zarni Maung
*Assistant Examiner*—Bharat Barot
(74) *Attorney, Agent, or Firm*—Charles A. Johnson; Mark T. Starr; Nawrocki, Rooney and Silvertson, P.A.

(57) ABSTRACT

Method and apparatus for a new interface architecture which reduces the number of software components required to interface a variety of requester types coupled to a server with a variety of communications programs coupled to an on-line transaction processing system. The new interface architecture isolate attributes of the requesters and the communication programs into individual software components so that all software code associated with each requester type is included within a corresponding requester software module, and all software code associated with each communications program is included within a corresponding communications software module. Each new requester type added requires the addition of only one requester software module, and each new communications program added requires the addition of only one communications software module, thus reducing the overall number of software modules required to interface the variety of requester types to the variety of communications programs.

41 Claims, 13 Drawing Sheets

```
550 typedef struct
{
        int     argc;           — 552
        char    **argv;         — 554
                *pGate_in_data; — 556
#ifdef WIN32
        DWORD           dwGate_in_data_len;     — 558
#else
        long            dwGate_in_data_len;
#endif
        ReqVars         *pVars;         — 560
        CookieInfo      *pCookies;      — 562
#ifdef WIN32
        BOOL            bWr_Cookies;    — 564
#else
        int             bWr_Cookies;    — 566
#endif
        int             Resp_Control;   — 568
        char            Resp_ContentType[80]; — 570
                *pTmp_User1,    — 572
                *pTmp_User2,    — 574
                *pWr_CookieBuf, — 576
                Reserved[40];
} GateInfo;
```

```
typedef struct
{
        char    *pServer_Software,
                *pServer_Name,
                *pServer_Protocol,
                *pServer_Port,
                *pRequest_Method,
                *pPath_Info,
                *pPath_Translated,
                *pScript_Name,
                *pQuery_String,
                *pRemote_Host,
                *pRemote_Addr,
                *pAuth_Type,
                *pAuth_Userid_Password,
                *pRemote_User,
                *pRemote_Ident,
                *pContent_Type,
                *pContent_Length,
                *pHttp_Accept,
                *pHttp_User_Agent,
                *pInternalData;
} ReqVars
```

FIG. 9

```
typedef struct
{
    char    *pCookie[20];    ~602
} CookieInfo;
```

FIG. 10

PROVIDING A MODULAR GATEWAY ARCHITECTURE WHICH ISOLATES ATTRIBUTES OF THE CLIENT AND SERVER SYSTEMS INTO INDEPENDENT COMPONENTS

CROSS REFERENCE TO CO-PENDING APPLICATIONS

The present application is related to U.S. patent application Ser. No. 08/622,099, filed Mar. 26, 1996 entitled "Transaction Service Independent HTTP Server-to Transaction Gateway", now U.S. Pat. No. 5,754,772, U.S. patent application Ser. No. 09/164,759, filed Oct. 1, 1998, entitled "A Common Gateway Which Allows Java Applets to Make Program Calls to OLTP Applications Executing on an Enterprise Server" still pending, and U.S. patent application Ser. No. 09/164,932, filed Oct. 1, 1998 entitled "A Multi-Client, User-Customized DCOM Gateway for an OLTP Enterprise Server Application" still pending, all assigned to the assignee of the present invention and incorporated herein by reference.

BACKGROUND OF THE INVENTION

Field of the Invention

The present invention relates generally to interfaces which interface a variety of requester types coupled to a server with a variety of communications programs coupled to an on-line transaction processing system, and more particularly, to such interfaces which isolate attributes of the requesters and the communications programs into individual software components. 2. Description of the Prior Art The methods by which companies conduct business with their customers are undergoing fundamental changes, due in part to world wide web technology. This same technology which makes a company accessible to customers around the world, may also be used on internal company networks, to complete operational and administrative tasks.

One of the technologies within the world wide web is the web browser. Web browsers are quickly becoming a defacto user interface standard to the world wide web because of their ability to interpret and display information having standard formats (e.g. HyperText Mark-Up Language (HTML), standard text GIF, etc.). Client software programs, typically referred to as web browsers (e.g. Mosaic, Lynx, etc.), execute on client systems and issue requests to server systems. Server systems typically execute HyperText Transport Protocol (HTTP) server programs, and process requests received from the web browsers.

Many businesses still have information maintained and managed by data base management systems such as DMS, RDMS, DB2, Oracle, Ingres, Sybase, Informix, and many others. Many of these database management systems are being utilized as resources within larger transaction processing systems. In view of this, businesses have begun to recognize and capitalize on the growing utility of web browsers to provide access to data stored within their database management systems.

To provide the access, software gateways, also known as "middle ware", execute on the server systems in order to link the web browsers to the data base management systems. A gateway typically receives a user request and associated data from the web browser, and packages the data into a specific format, and forwards the request and data to the data base management system. The data base management system then processes the request, and sends the result back to the gateway. The gateway may then provide the result to the requester in a specified format.

Gateways must accommodate many different types of user requests, as web browsers typically utilize any number of software languages. One type of request may be an application on the web browser which is executing the Java programming language (e.g. a Java applet). This approach is described in U.S. patent application Ser. No. 09/164,759. entitled "A Common Gateway Which Allows Java Applets to Make Program Calls to OLTP Applications Executing on an Enterprise Server" still pending, which has been incorporated herein by reference. Another type of request may be an application running under the MicroSoft DCOM environment. This approach is described in U.S. patent application Ser. No. 09/164,932 entitled "A Multi-client User-customized DCOM Gateway for an OLTP Enterprise Server Application" still pending, which has been incorporated herein by reference. Yet another type of requester is when the Web Browser provides requests in Hyper Text Markup Language (HTML) format. This approach is described in U.S. patent application Ser. No. 08/622,099 entitled "Transaction Service Independent Http Server-to Transaction Gateway", now U.S. Pat. No. 5,754,772, which has been incorporated herein by reference.

Each of the different types of requests described above require a specific gateway to be serviced. For example, a Java gateway must be provided to service requests from the Java applets. A DCOM gateway must be provided to service requests from applications running under the MicroSoft DCOM environment. And yet another gateway must be provided to support requests from the Web Browser in the HTML format.

These various gateways must also support a wide variety of communications programs which are used to provide communications between the server systems and the database management systems. Each communication program has specific communications protocol requirements, thus requiring unique input and output formats. Examples of communications programs include Pathway (commercially available from the Unisys Corporation), HTP/ic (commercially available from the Unisys Corporation) and COMAPI.

Thus gateways must accommodate many different types of requesters and a variety of communications programs. The gateway typically includes software code which accepts and processes a specific type of requester, which is integrated with the code to interface to the communications programs. For example, if the requester is the Java Applet, the gateway to support the Java Applet must support each type of communications program the Java Applet may access. Thus, for example, three Java gateways must be created if a Java Applet is to have access to three different communications programs such as Pathway, HTP/ic, and COMAPI. The same is true for DCOM and HTML request types.

Thus, in prior art systems where each requester must access a number of communications programs, the required number of gateways resident on the server is equal to the number of requester types times the number of communications programs to which access is required. Unfortunately, this approach requires a potentially large number of different types of gateways. And each time a new communications program is added, a new version of each gateway must be created. Since each new gateway requires customized interfaces involving extensive rewriting of gateway software, this task can be prohibitively time consuming and expensive.

SUMMARY OF THE INVENTION

The present invention overcomes the disadvantages found in the prior art by providing a new gateway architecture which reduces the number of software components required to interface a number of requesters with a number of communications programs. The new interface architecture isolates attributes of the requesters and communications programs into individual software components or modules, so that all software code associated with each requester type is included within a corresponding requester software module, and all software code associated with each communications program is included within a corresponding communications software module. Each requester software module can communicate with every communications software module through a standardized interface consisting of a number of program calls.

The new gateway architecture reduces the amount of software code required to add a new requester or communications program. Each new requester type added requires the addition of only one requester software module, and each new communications program added requires the addition of only one communications software module. This reduces the overall number of software modules required to interface the requesters to the communications programs to a number equal to the number of requesters plus the number of communications programs.

In a preferred embodiment of the present invention, an interface is provided for linking each one of a number of requesters to each one of a number of communications programs. The interface comprises a number of first modules wherein each first module Corresponds to one of the number of requesters. The interface further comprises a number of second modules wherein one of a number of second modules corresponds to one of the number of communications programs. The first modules interface with the second modules by passing a number of function calls between the first modules and the second modules, thus allowing requests to be submitted from the first module to the second module and results to be returned from the second module to the first module.

One of the number of function calls is a first initialize function. The first initialize function is called once when a new requester is added. The first initialize function may be initiated by any means, such as an administrative program. The first initialize function initializes the first module and loads the corresponding second module corresponding to the desired communications program. The first initialize function further makes a second initialize function call to initialize the second module. The first initialize function may perform any number of functions within the scope of the present invention. These functions include establishing a communications session with the corresponding second module, opening an application program which is resident on the server, or assigning memory resources on the server.

The second initialize function may also perform any number of functions within the scope of the present invention. These functions include establishing a communications session with the desired communications program, opening an application program which is resident on the server, or assigning memory resources on the server.

Another, function call is a first process request function. The first process request function is called by the first module to format the service request received from the requester for a second process request function call to the corresponding second module, in order to send the service request to the second module. The first process request function also formats the result returned from the second module in response to the service request, and returns the result to the requester.

The second process request function formats the service request received from the first module, so that the second module can send the service request to the desired communications program. The second process request function also formats the result received from the communications program in response to the service request, so that the result can be returned to the corresponding first module.

Another function call is a first cleanup function. The first cleanup function is called once when a requester is stopped or removed. The first cleanup function may be initiated by any means, such as an administrative program. The first cleanup function terminates the first module and calls the second cleanup function. The second cleanup function terminates the second module.

The effort to add new requesters or communications programs is greatly reduced over the prior art due to the use of program calls to create the standardized interface between the first and second modules. To add new requesters or communications programs, a minimal amount of new software code is required to create the new software modules, whether they are first modules to interface with new requesters, or second modules to interface with new communications programs.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 8 is a diagram showing the informational data structure used in the present invention;

FIG. 9 is a diagram showing the data structure used to reference data variables provided by a web server;

FIG. 10 is a diagram showing the data structure used to reference cookie data received by the server from the client browser.

DETAILED DESCRIPTION OF THE PREFERRED EMBODIMENTS

Figure 1:
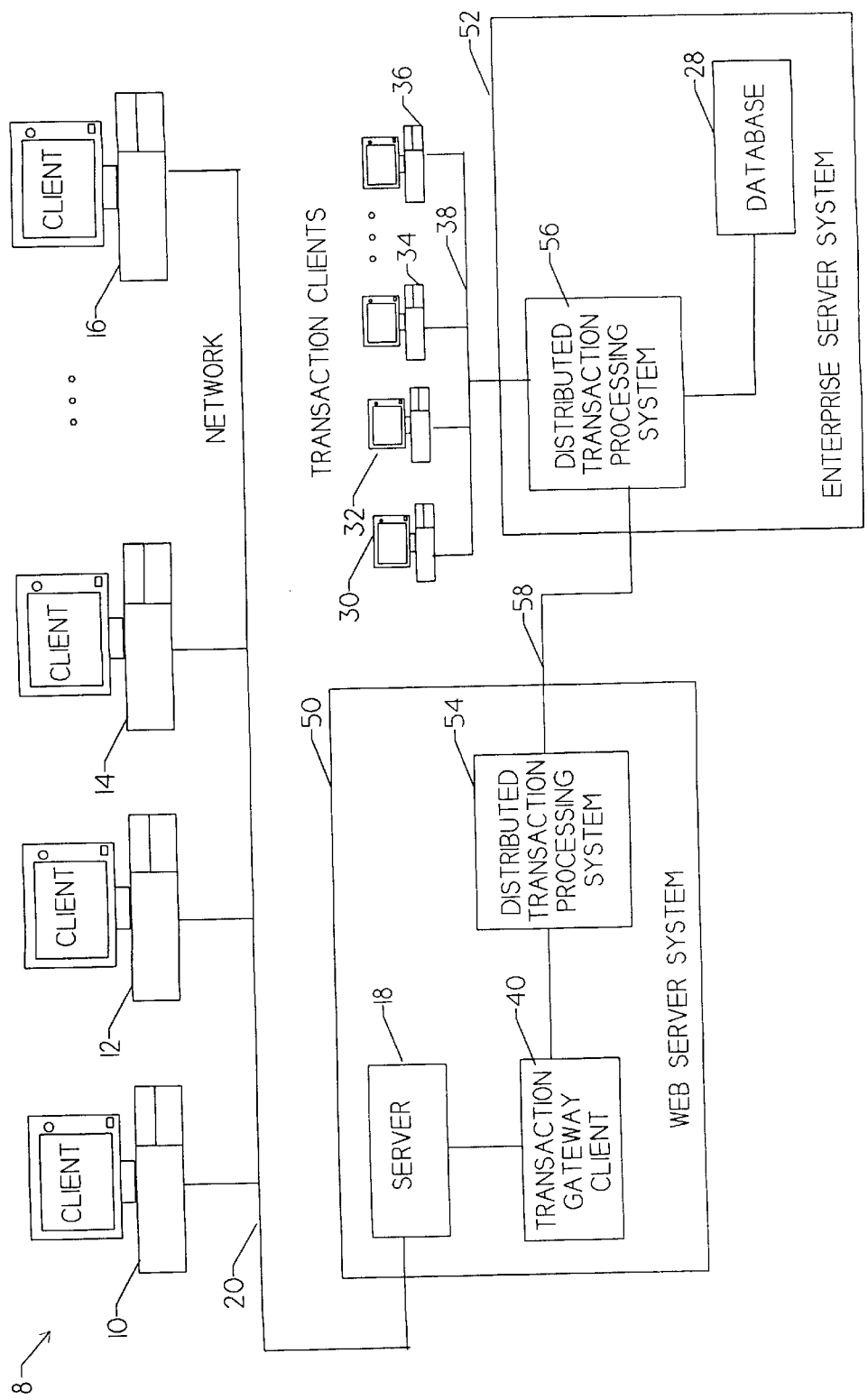
FIG. 1 is a block diagram of the preferred data processing system in which the present invention is implemented.

FIG. 1 is a block diagram of the preferred data processing system 8 in which the present invention may be implemented. It is recognized that the present invention may be utilized in any data processing system wherein an interface is required to interface a variety of requester types coupled to a server, to a variety of communications programs coupled to an on-line transaction processing system.

In the preferred embodiment, a plurality of PC/Workstations, designated as clients 10, 12, 14 and 16 are coupled to a server 18 via a network 20. The network 20 may be an internal local area network, or may be the Internet. In a preferred embodiment, each of the clients 10, 12, 14 and 16 is a web browser. The web browsers may be personal computers or workstations having operating system software and application software. This software provides Graphical User Interface (GUI) and communications capabilities to enable the client to communicate with server application 18 via network 20. In alternative embodiments, the clients may be visual basic clients, or in general any GUI client.

Workstation server system 50 may be any class of machines which are capable of running a server application 18 along with a distributed transaction processing system 54. With the transaction processing system 54, a transaction is formatted on the workstation server system 50 and forwarded to the enterprise server system 52 for processing.

In the preferred embodiment, the enterprise server system 52 is a Unisys 2200 series data processing system which includes a distributed transaction processing system 56. The distributed transaction processing system 56 encompasses the same functionality as a monolithic transaction processing system. But, in the preferred embodiment, the distributed transaction processing system 56 is distributed to be compatible with the distributed transaction processing system 54. Distributed transaction processing systems 54 and 56 utilize transaction manager software, such as the open/OLTP transaction manager software from Unisys, and utilize user implemented open/OLTP services. Distributed transaction processing system 54 is coupled to distributed transaction processing system 56 via network 58. Preferably, the network interface for network 58 is separate from the network interface for network 20.

Distributed transaction processing system 56 provides data from database 28 to transaction clients 30, 32, 34 and 36. Transaction clients 30, 32, 34 and 36 are coupled to distributed transaction processing system 56 via interface 38.

In the preferred embodiment, transaction gateway client 40 allows server 18 to interface with the transaction processing system. When client 10, 12, 14 or 16 selects an enterprise based service, the request is routed to server 18, which in turn routes the request to transaction gateway client 40. Transaction gateway client 40 determines the requested service and forwards the necessary information to distributed transaction processing systems 54 and 56. Distributed transaction processing systems 54 and 56 process the request within database 28 according to the specified request (e.g., select, update, delete etc . . . ). Distributed transaction processing systems 54 and 56 returns data and/or status information tool transaction gateway client 40, which in turn formats the data in an appropriate manner for server 18. Server 18 then returns the information to requesting client 10, 12, 14 or 16.

Figure 2:
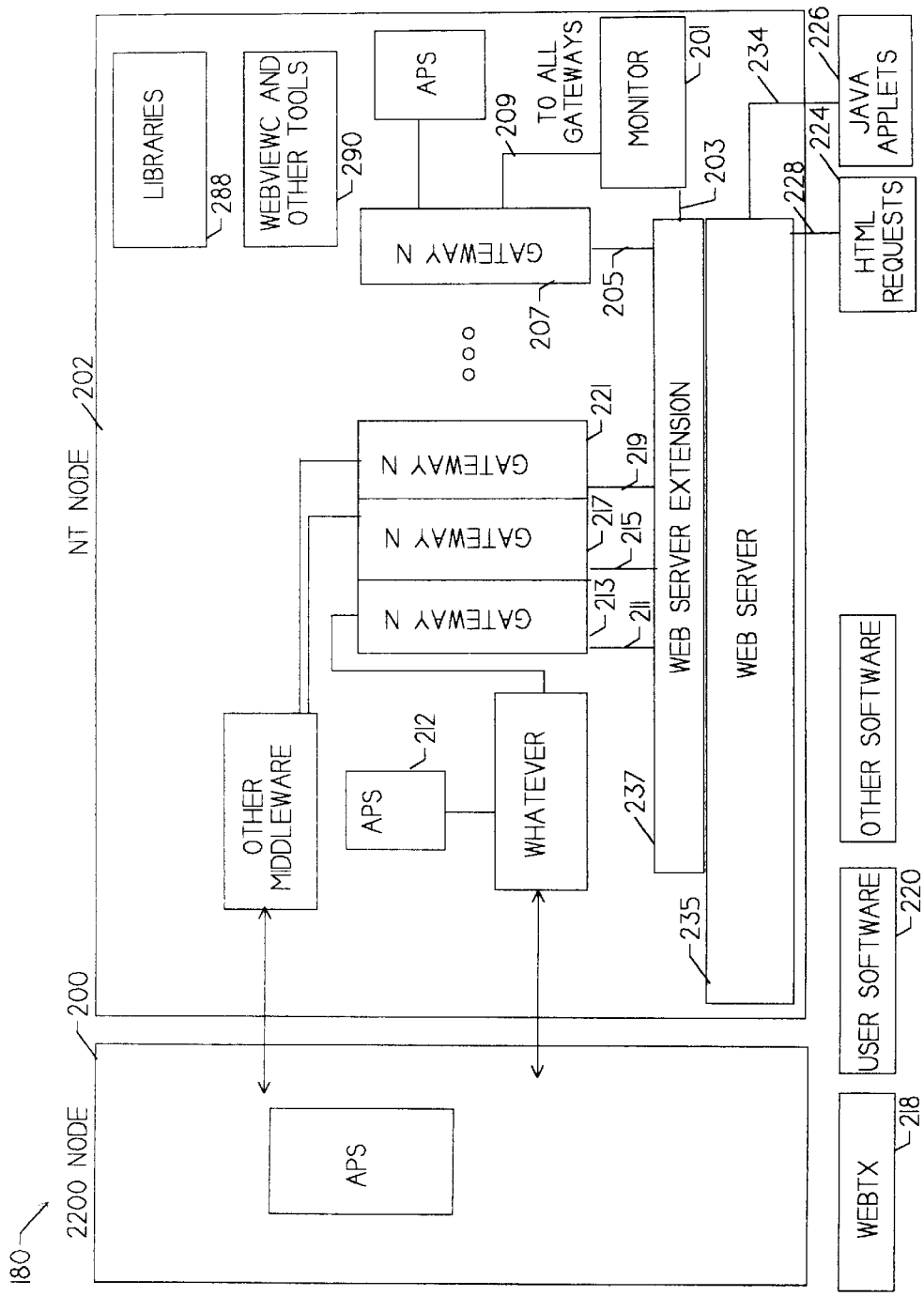
FIG. 2 is a block diagram of the preferred processing environment of the present invention.

FIG. 2 is a block diagram of the preferred processing environment of the present invention. A general WebTx processing environment is shown at 180. WebTx is a Unisys product. In general, WebTx is middleware in a client/server computing environment which accepts requests from the client side and routes the requests to the correct place on the server side, then passes a response from the server side back to the client side. In the context of the present invention, WebTx "marries" a Microsoft client/server architecture (such as the NT node shown at 202) with a transactional client/server architecture (such as the Unisys 2200 enterprise node shown at 200).

The WebTx environment, as utilized in the present invention, is comprised of several components, including a monitor 201, a web server extension 237, one or more gateways 213, 217, 221, and 207, the WebViewC compiler 290, a set of libraries 288, and other special purpose tools shown at 220.

WebTx Monitor 201 communicates with web server extension 237 via interface 203, and gateway 207 via interface 209. Monitor 201 functions as the WebTx administrative tool. One function of Monitor 201 is to start and stop gateways 207, 213, 217, and 221, as required. Under a Unix environment, the WebTx monitor module is known as WebMon, while under the Windows NT environment, the WebTx monitor module is known as WtxSvc.

WebTx web server extension 237 is a run-time extension of web server 235 (such as Netscape FastTrack, Netscape Enterprise, or Microsoft IIS). The function of web server extension 237 is to intercept requests intended for WebTx 218, and instead route the requests to gateways 207, 213, 217, and 221. Web server extension 237 will also interpret the response from the gateways, and route the reply. Web server extension 237 is coupled to gateways 213, 217, 221 and 207 via interfaces 211, 215, 219 and 205, respectively. Web server extension 237 is connected to monitor 201 via interface 203, and HTML requester component 224 via interface 228, and Java applet 226 via interface 234.

Gateways 213, 217, 221 and 207 perform tasks which are grouped into conceptual areas. Gateways 213, 217, 221 and 207 receive requests from web server extension 237, or from applications 212, and take whatever action is necessary to fulfill the request. This typically involves transforming a request (such as a URL from a web browser) into a format which is understand by a distributed transaction processing system such as that within, for example, enterprise server system 52 (see also, FIG. 1). Gateways 213, 217, 221 and 207 also transform data returned from the distributed transaction processing system into a formatted response which is returned to the requester.

WebViewC compiler 290 is used in conjunction with specific Unisys gateway implementations, such as ViewGate, TUXGate, or JGate. WebViewC compiler 290 compiles open/OLTP view files generated on the OLTP enterprise system to create WebTx view files (.wv) and HTML files (.html). WebViewC compiler 290 is a free-standing component with no direct communication to any of the other components within the WebTx environment.

Other WebTx Components include libraries 288 or the Software Development Kit (SDK) libraries, which provide framework and functions for building custom gateways. The SDK is specifically designed to allow customers to build their own gateways. Another type of library present within the WebTx system are Java class libraries, which provide class definitions for building JGate compatible applets.

Figure 3:
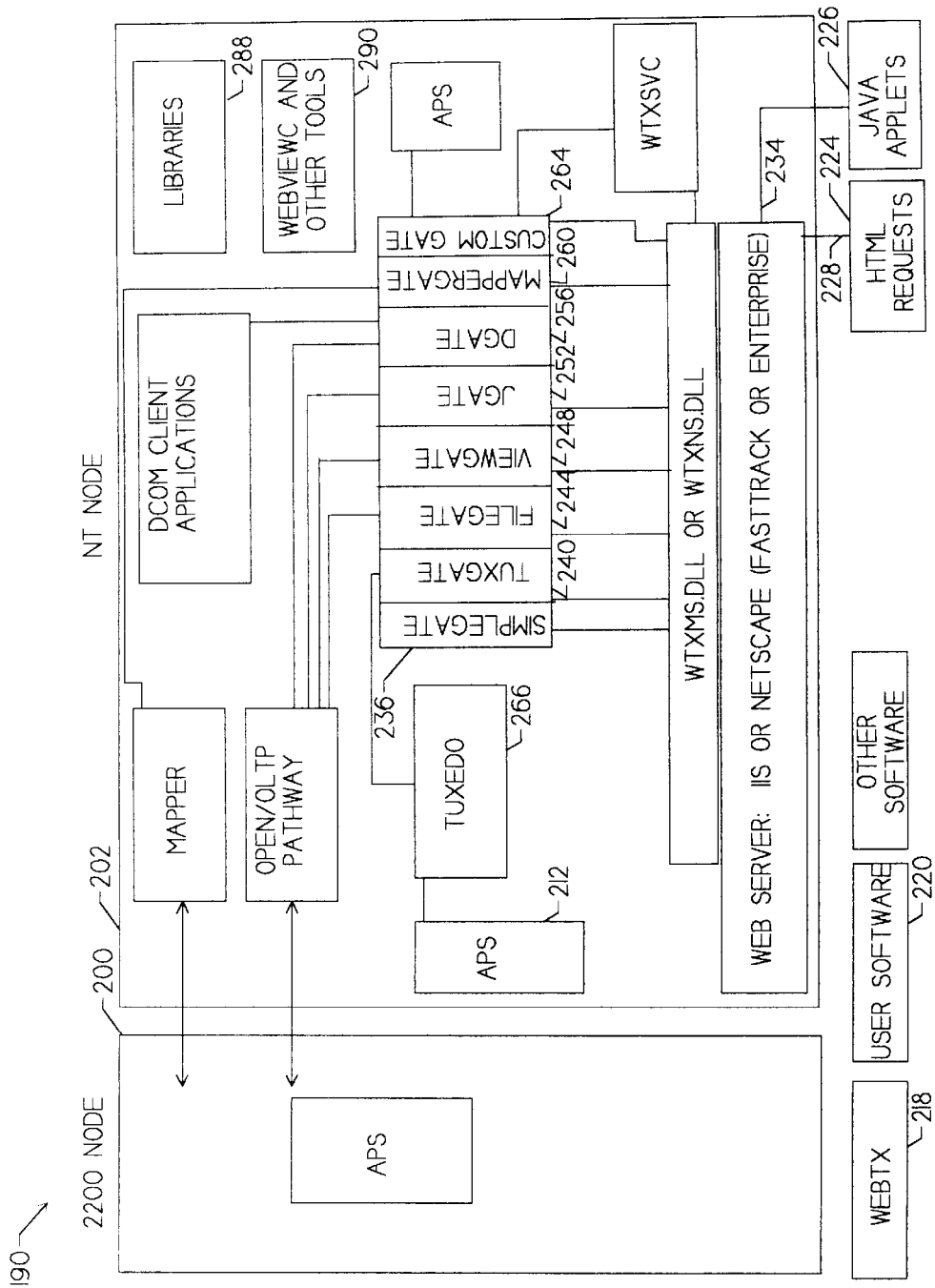
FIG. 3 is a block diagram showing the MicroSoft NT processing environment in which the present invention is used.

FIG. 3 is a block diagram showing the Microsoft NT processing environment in which the present invention is used. The block diagram shown at 190 includes WebTx components utilized within a Microsoft NT environment and specific gateway implementations within Windows NT node 202.

SimpleGate Gateway 236 is a Unisys product which is specifically utilized as a test tool. It merely echoes a request. The TUXGate Gateway 240 is a Unisys product which provides generalized access to OLTP services through Tuxedo 266. Tuxedo 266 acts as the hub for distributed enterprise and Internet three-tier applications. Tuxedo 266 provides an open environment that supports a wide variety of clients, databases, networks, legacy systems, and communications options. The FileGate Gateway 244 is a Unisys product which works in conjunction with a specific OLTP service to access textual files on the Unisys 2200 node. ViewGate 248 is a Unisys product which provides generalized access to OLTP services on the Unisys 2200 node (e.g. HTML output). JGate 252 is a Unisys product which provides generalized Java applet access to OLTP services on the Unisys 2200 node. DGate gateway 256 is a Unisys product which provides generalized DCOM access to OLTP services on the Unisys 2200 node. MapperGate gateway 260 is a Unisys product which provides generalized access to mapper applications within the Microsoft Windows NT Environment. Custom gateway 264 is a user customized gateway wherein a customer can build a custom gateway to interface custom applications to an OLTP enterprise application.

Figure 4:
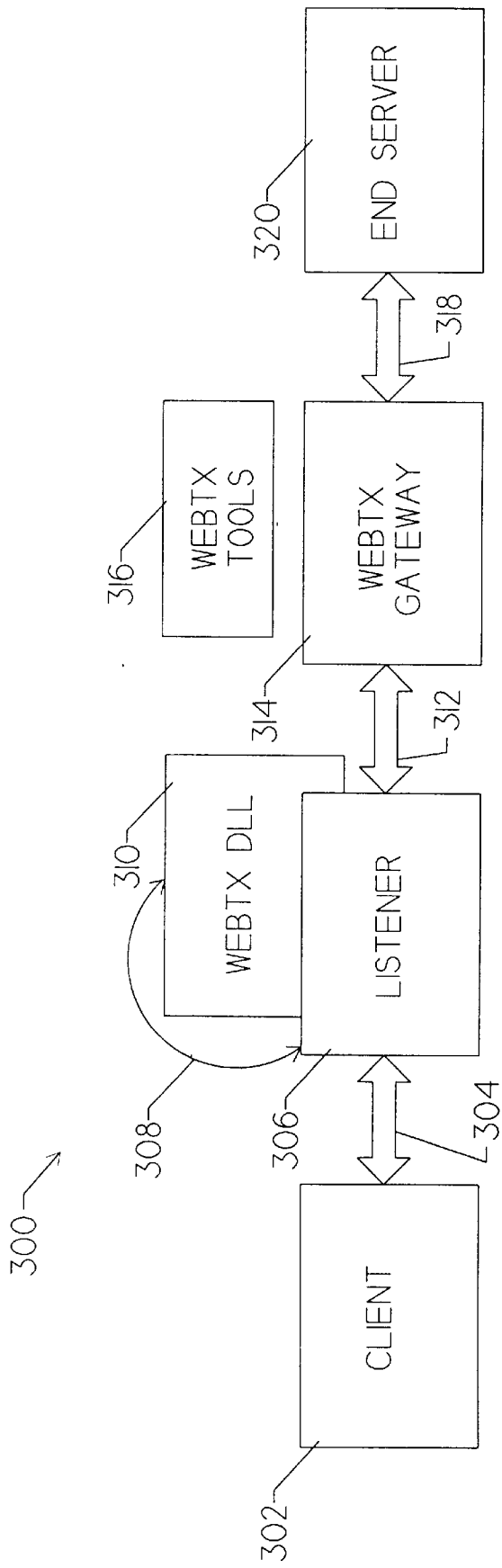
FIG. 4 is a block diagram showing a prior art gateway architecture.

FIG. 4 Is a block diagram showing a prior art gateway architecture. The prior art gateway architecture is found generally at 300. In the diagram at 300, a client 302 is coupled to a listener 306 via an interface pathway 304. Client 302 may be any of clients 10, 12, 14, or 16, as discussed in FIG. 1. Client 302 may incorporate other applications such as Internet Explorer, DCE and Tracker. Listener 306 corresponds to web server system 50 shown in FIG. 1. Listener 306 may incorporate such applications as Netscape Server, DCE Connector or Tracker Connector. Listener 306 includes web server 235, operating with web server extension 237 (see FIG. 2). The web server extension is shown as WebTx DLL 310, which is coupled to listener 306 via interface 308. Listener 306 is coupled to WebTx gateway 314 via interface 312. WebTx gateway 314 may be any type of gateway, and may correspond to any of gateways 213, 217, 221 or 207, discussed in FIG. 2, or gateways 236, 240, 244, 248, 252, 256, 260 or 264, discussed in FIG. 3. WebTx tools 316 is discussed in FIG. 2 and FIG. 3. WebTx gateway 314 is coupled to end server 320 via interface 318. End server 320 may be any application on any systems such as OLTP or Mapper.

WebTx gateway 314 receives user requests from listener 306, along with data, and packages the data into a specific format, then forwards the request and the data to end server 320. End server 320 then processes the request, and may send a result back to WebTx gateway 314. WebTx gateway 314 then provides the result to client 302 in a specified format.

Figure 5:
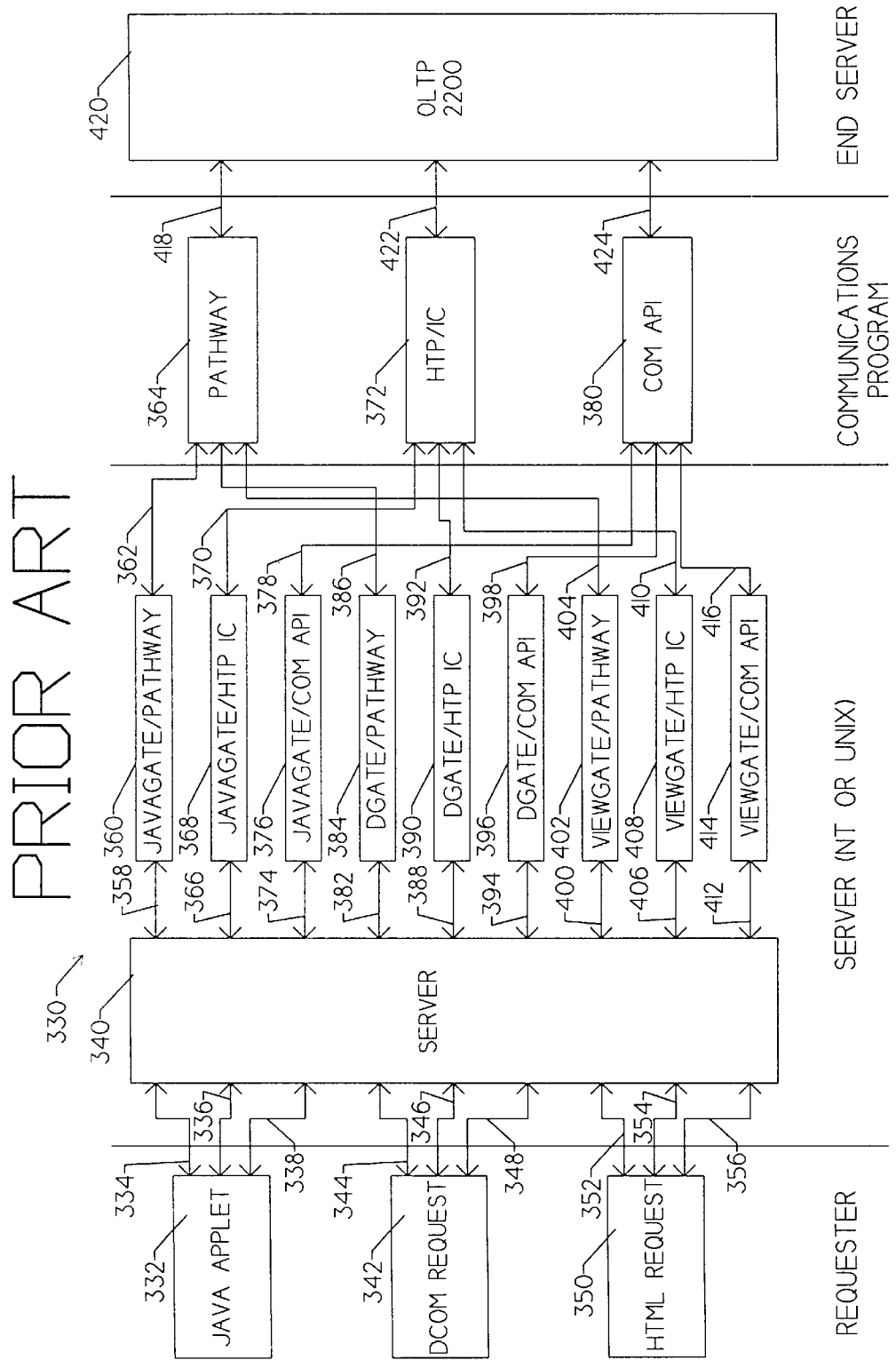
FIG. 5 is a block diagram illustrating prior art gateways incorporated within the data processing system of FIG. 1.

FIG. 5 is a block diagram illustrating prior art gateways incorporated within the data processing system of FIG. 1. The diagram is shown generally at 330. Java applet 332 is coupled to server 340 via interfaces 334, 336, and 338. Java applet 332 is discussed in Application Ser. No. 09/164,759 filed Oct. 1, 1998, entitled: "A Common Gateway Which Allows Java Applets to Make Program Calls to OLTP Applications Executing on an Enterprise Server", which has been incorporated herein by reference. DCOM request 342 is coupled to server 340 via interfaces 344, 346 and 348. DCOM request 342 is discussed in more detail in U.S. patent application Ser. No. 09/164,932, filed Oct. 1, 1998, entitle: "A Multi Client User Customized DCOM Gateway for an OLTP Enterprise Server Application", which has been incorporated herein by reference. HTML request 350 is coupled to server 340 via interfaces 352, 354 and 356. HTML request 350 is discussed in more detail in U.S. patent application Ser. No. 08/622,099 filed Mar. 26, 1996 entitled: "Transaction Service Independent Http Server to Transaction Gateway", which has been incorporated herein by reference.

Server 340 is coupled to a number of gateways, corresponding to Java applet 332, DCOM request 342 and HTML request 350. Server 340 is coupled to Java gate/Pathway 360 via interface 358. Server 340 is coupled to Java gate/ HTP IC 368 via interface 366. Server 340 is coupled to Java gate/COM API 376 via interface 374. Since Java applet 332 is one type of provider of service requests, the gateways at 360, 368 and 376 are provided to service the requests from Java applet 332.

Since another type of requester is an application running under the Microsoft DCOM environment, in order to service a request from DCOM request 342, DCOM gateways are required. Server 340 is coupled to Dgate/Pathway 384 via interface 382. Server 340 is coupled to Dgate/HTP IC 390 via interface 388. Server 340 is coupled to Dgate/COM API 396 via interface 394. Each of the gateways at 384, 390 and 396 may service requests from DCOM request 342.

Yet another type of requester is a web browser which provides requests in Hyper-Text Markup Language (HTML) format. The HTML requester is shown as HTML request 350. These types of requests are handled by the following gateways. Server 340 is coupled to Viewgate/Pathway 402 via interface 400. Viewgate/HTP IC 408 is coupled to server 340 via interface 406. Viewgate/COM API 414 is coupled to server 340 via interface 412. Any of the gateways at 402, 408 or 414 may service requests from HTML request 350.

In the prior art data processing system shown in FIG. 5, the gateways were customized for specific communications programs, because each communications program typically utilizes a specific communications protocol, and thus requires input parameters and services calls to be passed in a specific and unique format. Three types of communications programs are shown in FIG. 5, but it is understood that many others may be commercially available and within the scope of the present invention.

Pathway 364 is the Pathway program, which is commercially available frog BEA Corporation. HTP/IC 372 is the HTP/IC program commercially available from Unisys Corporation. COM API 380 is a third example of a communications program.

In the prior art data processing system shown at 330, the gateway code to accept and process a specific kind of user request is integrated with the code which interfaces with the communication program. Thus, for a given request or type such as Java applet 332, a specific gateway must be created for each type of communications program that the requester must access. Therefore, three Java gateways are required so Java applet 332 can have access to Pathway 364, HTP/IC 372 and COM API 380. Therefore, JGate/Pathway 360 is coupled to Pathway 364 via interface 362. JGate/HTP IC 368 is coupled to HTP/IC 372 via interface 370, and JGate/COM API 376 is coupled to COM API 380 via interface 378.

The same is true for a request from DCOM request 342. Thus, Dgate/Pathway 384 is coupled to pathway 364 via interface 386. Dgate/HTP IC 390 is coupled to HTP/IC 372 via interface 392. And Dgate/COM API 396 is coupled to COM API 380 via interface 398.

The same is also true for requests from HTML request 350. Viewgate/Pathway 402 is coupled to pathway 364 via interface 404. Viewgate/HTP IC 408 is coupled to HTP/IC 372 via interface 410. And Viewgate/COM API 414 is coupled to COM API 380 via interface 416.

Pathway 3164 is coupled to OLTP 2200 420 via interface 418. HTP/IC 372 is coupled to OLTP 2200 420 via interface 422. And COM API 380 is coupled to OLTP 2200 420 via interface 424.

Thus, in the prior art data processing system shown at 330, the number of gateways required on the server is equivalent to the number of requester types times the number of communications programs. Three requester types are illustrated, Java applet 332, DCOM request 342 and HTML request 350. Three communications programs are illustrated, pathway 364, HTP/IC 372 and COM API 380. Therefore, the number of gateways required is equal to three requesters times three communications programs, for 9 gateways total. These 9 gateways are shown at 360, 368, 376, 384, 390, 396, 402, 408, and 414. Thus the prior art system has a disadvantage of requiring a potentially large number of different types of gateways to be resident on the server. Furthermore, every time a new communications program must be added, a new version of each gateway must be created.

Figure 6:
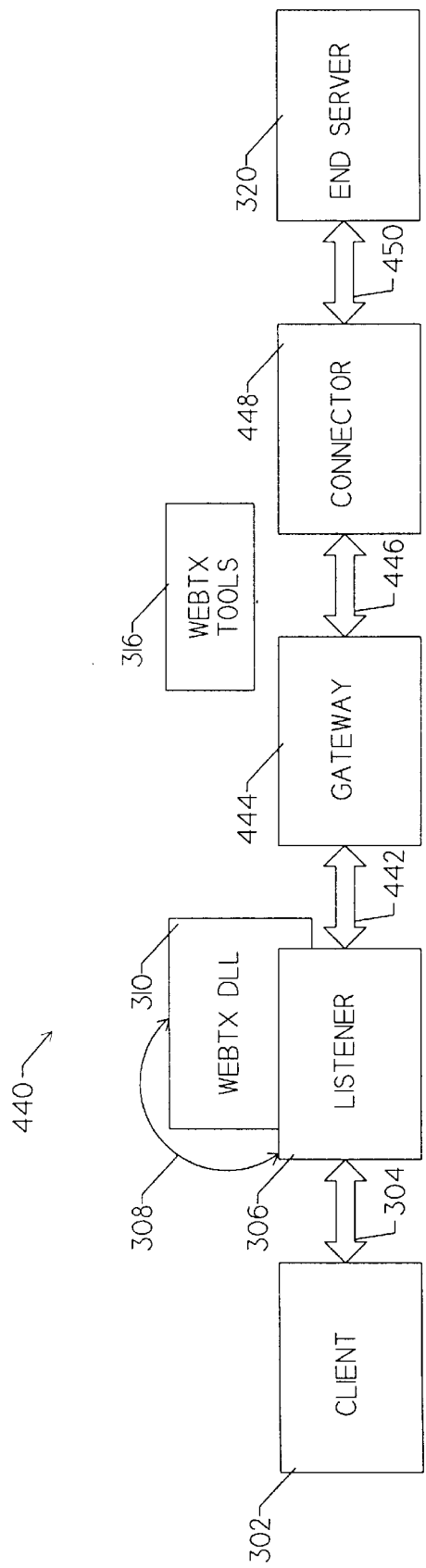
FIG. 6 is a block diagram illustrating the gateway connector architecture of the present invention.

FIG. 6 is a block diagram illustrating the gateway connector architecture of the present invention. The diagram is shown generally at 440. FIG. 6 is in many respects similar to FIG. 4, with the exception that gateway 444 and connector 448 now replace WebTx gateway 314.

Gateway 444 contains all software code associated with handling a specific requester type or client. All software code associated with handling the communications program to communicate with end server 320 is included within connector 448. Any gateway 444 can communicate with any connector 448 via interface 446. Gateway 444 is coupled to listener 306 via interface 442. Connector 448 is coupled to end server 320 via interface 450.

The new architecture shown at 440 splits the functions previously handled by WebTx gateway 314 into the gateway 444 and connector 448 modules. Gateway 444 manages communications to and from the user interface, shown as client 302, and also handles any formatting associated with this communication. Gateway 444 may be any gateway, as such as an OLTP gateway, Mapper gateway, Java gateway, Dgate gateway or Viewgate gateway.

Connector 448 prepares data received from the gateway, to the format required by the application being used to talk to end server 320. These applications may include any number of communication programs such as Pathway, HTP/IC or COM API (see FIG. 5).

End server 320 may be any application on any system upon which service requests are sent and results are returned. In the preferred embodiment, end server 320 is an OLTP 2200 system. Connector 448 formats data received from end server 320 to a defined format, so that the data may be returned to gateway 444.

The WebTx environment provides a number of libraries of C functions to create the gateways. Gate.lib provides basic gateway functions including the main() function. Tools.lib provides convenient functions for manipulating input and output data. ViewLib.lib provides input and output data manipulation functions for gateways that interoperate with Open/OLTP applications.

Three additional C functions are required. These are the Initialize function, the ProcessRequest function and the Cleanup function. The main() function provided in the gate.lib library calls these three functions during operation of the gateway. These functions will be described in more detail below.

The required functions of gateway 444 are now described in more detail. It is understood that while all specific references are to an NT platform, they are applicable to Unix platforms as well. First, gateway 444 includes a connector header file, connect.h. This file contains definitions for the three above functions called from the gateway. This file is located in the WebTx/Include directory.

Gateway 444 also includes the Initialize, ProcessRequest, and Cleanup functions. Each of these functions calls a corresponding connector function within connector 448. The connector functionality is described in more detail below.

The Initialize function is called when the gateway process is started. This function contains any code required to initialize the gateway module. This may include establishing communications session, opening an application, or assigning any required local resources. The Initialize function returns a "0" for a normal completion, or "−1" for an error condition. An error condition returned from the Initialize function causes the gateway to terminate. The prototype for this function is "int Initialize(Gateinfo *Info);".

The Initialize function also loads the connector module shown at connector 448, and initializes entry points to required connector functions. A function call contained in the WebTx tools library will load the connector DLL/SO so that it is specified by a connector parameter in the gateway configuration The DLL/SO also contains the three connector functions, Co Initialize, ConProcessRequest, and ConCleanup, described below described below. The function call to load the connector DLL/SO in the Windows NT environment is "LoadDLL()", and in the Unix environment is "LoadSO()".

The Initialize function also makes the following function calls to the connector initialize function. In the Windows NT environment, the function call is "ConInitialize(Info)". In the Unix environment, the function call is "(*PtrConInitialize) (Info)." These function calls may also contain coded needed to initialize gateway 444, open applications, or assign any required local resources.

The gateway main() function calls the ProcessRequest function once for each web request routed to the gateway process. This function contains code to parse input data (e.g. the GateInfo structure described later). This function also contains code to handle request data from the client. The client may refer to the calling program, which may be a web browser, VB program, C++ program, or any other of a number of programs. The ProcessRequest function also formats the request data for the call to the connector process request function. The ProcessRequest function also formats response data received from the connector function, and returns the response data to the client.

The ProcessRequest function returns a "0" for normal completion, or a "−1" for an error condition. An error return from the ProcessRequest function causes the gateway to terminate. The prototype for this function is "int ProcessRequest (GateInfo *Info);".

The ProcessRequest function makes the following function call to connector 448. In the Windows NT environment, the function call is "ConProcessRequest(Info,& Data,View, SvcName,&Size)". In the Unix environment the function call is "(*PtrConProcessRequest)(Info,&Data,View, SvcName,&Size)".

The gateway main() function also calls the Cleanup function when the gateway is terminating. This function contains any code required for a clean gateway termination. This function terminates a communication session, closes an application, or frees any assigned local resources. The Cleanup function should return a "0" for a normal completion, or a "−1" for an error condition. An error return from Cleanup causes the gateway to terminate. This Cleanup function has the prototype of "int CleanUp(GateInfo * Info);".

The Cleanup function further makes a function call to Connector 448 as follows. In the Windows NT environment, the function call is "ConCleanup (Info)". In the Unix environment, the function call is (*PtrConCleanup) (Info).

Next the functionality of the Connector 448 module will be described. The three functions required by connector 448 are ConInitialize, ConProcessRequest, and ConCleanup. These functions are called from the gateway module (e.g. gateway 444, as discussed above. These functions serve the same purpose as the corresponding gateway functions, except they control the communication programs, instead of the user interface.

The ConInitialize function is called from gateway 444, via the Initialize function, when the gateway process has started. This function contains any code required to initialize the connector 448 module, such as establishing a communications session, or allocating connectors for specific resources. The prototype for the ConInitialize function is "int ConInitialize(GateInfo *Info);.

The ConProcessRequest function is called from gateway 444 via the ProcessRequest function, for each web request routed through the gateway process. The main purpose of this function is to handle any interaction with the communications program.

The following steps are performed by the ConProcessRequest function. First, the data received from the gateway module is formatted so that it can be used by the communication program. This includes any actual data included in any view, and any other parameters that are required by the communication program. Examples of the parameters are "service name", "transaction", "ip address", etc. The next step performed by the ConProcessRequest function is to call the communication program. The next step performed by the ConProcessRequest function is to format the response data received from the communication program so that the data can be returned to gateway 444. The last step performed by the ConProcessRequest function is to return the formatted data to gateway 444 along with a return value of "0" if the function is completed without error. If the function encounters an unrecoverable error, a value of "−1" is returned to gateway 444.

The prototype for the ConProcessRequest function is "int ConProcessRequest(GateInfo *Info, char **Data, char *View, char *ServiceName, long *Size);"

The ConCleanup function is called from gateway 444 via the Cleanup function when the gateway process is terminated. This function contains any code required to clean up the gateway, such is terminating a communication session, closing applications, or freeing any local resources assigned.

The prototype for the ConCleanup function is "int ConCleanup(GateInfo *Info);".

The interface between gateway 444 and connector 448 includes the gateway functions Initialize, ProcessRequest, and Cleanup, and the connector functions ConInitialize, ConProcessRequest and ConCleanup. The interface also includes the parameters passed to these functions. The function parameters are described below.

GateInfo *Info is a parameter which is an informational data structure used throughout all the gateways. An Info->pTmp_User1 variable in this structure points to a buffer of name/value pairs that contain connector specific information. This information may be unique to a specific connector, or may be needed for multiple connectors. The difference between this information and the parameters in the function call is that this information is not needed for every connector. Name/value pairs defined for this interface include: Type (e.g. view buffer type), Host, Port, Transaction and Build. This list is exemplary of information required by connector 448, but it is understood that many more types of information may be utilized.

The Char Data parameter is both an input and output parameter. The buffer pointed to by this parameter contains the request data received from the user interface, and must be in the form of a view. The data in this buffer must be formatted as defined by an input view parameter. The memory for this buffer is allocated in gateway 444 using the function malloc(). Gateway 444** frees this buffer using the function free().

Upon return from the function, this parameter is a pointer to a buffer that contains the response data. The response data in this buffer must be formatted as defined by the output view parameter. If the memory required for this buffer is greater than that of the input buffer, connector 448 must reallocate the memory using the function realloc(). It is important to reallocate the same buffer, so gateway 444 can free the memory, before exiting the ProcessRequest function.

The char *View parameter is both an input and output parameter, since the output view may be different from the input view. Upon input, this parameter is a pointer to the name of the view buffer that defines the request data. Upon output, this parameter is a pointer to the name of the view buffer that defines the response data.

The char *ServiceName parameter is a pointer to the name of the application that will be called on end server 320. In the case of the Open/OLTP system, this will be the name of the service.

The long *Size parameter is both an input and an output parameter. Upon input, this is the size of the request data buffer. Upon output, this is the size of the response data buffer.

Figure 7:
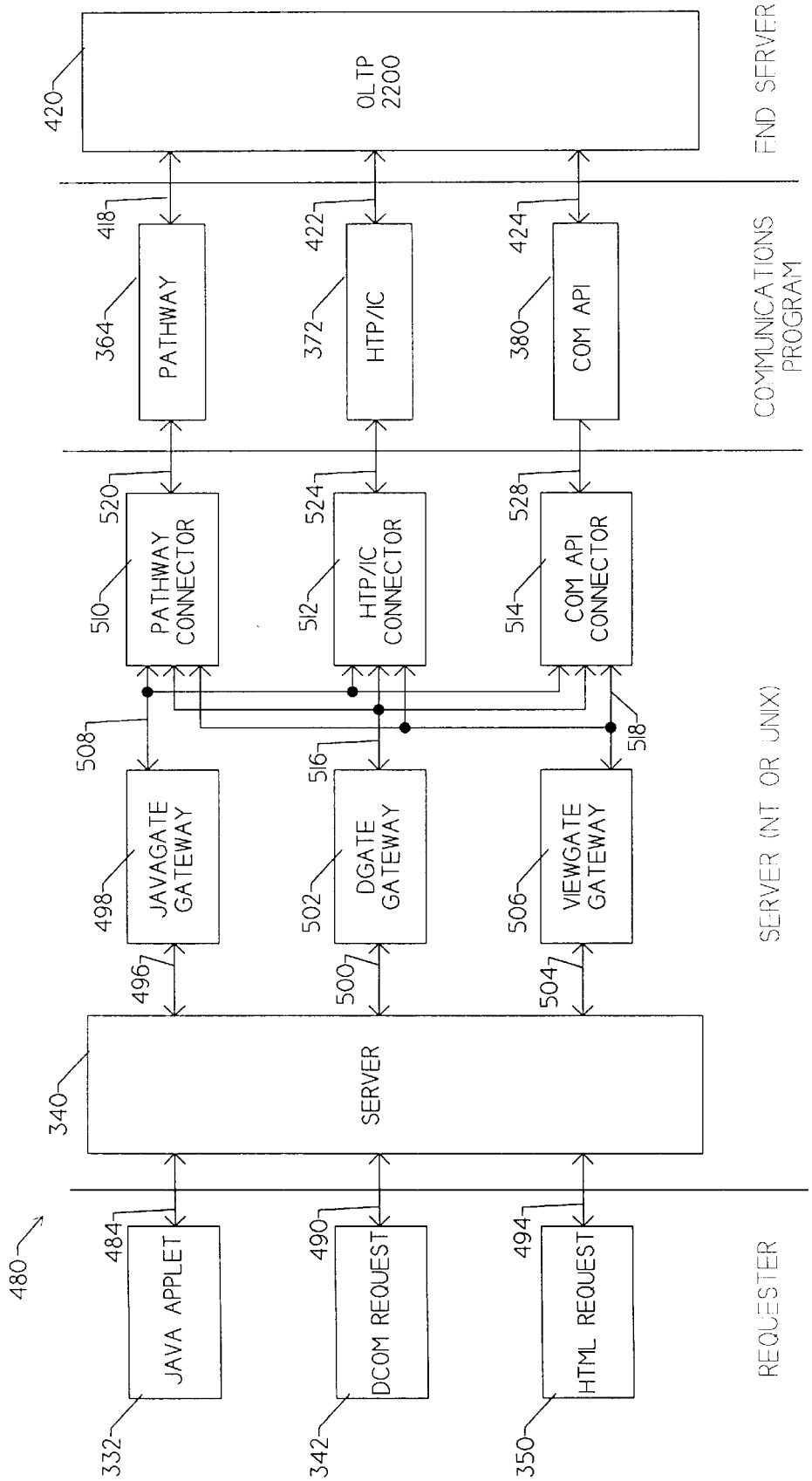
FIG. 7 is a block diagram illustrating a preferred embodiment of the present invention showing the gateway connector architecture incorporated within the data processing system of FIG. 1.

FIG. 7 is a block diagram illustrating a preferred embodiment of the present invention, showing the gateway connector architecture incorporated within the data processing system of FIG. 1. The diagram at 480 illustrates the reduced number of software components required to couple the requesters at 332, 342 and 350, to the communications programs at 364, 372 and, 380. Java applet 332 is coupled to server 340 via interface 484. DCOM request 342 is coupled to server 340 via interface 490. HTML request 350 is coupled to server 340 via interface 494.

Server 340 is coupled to JGate gateway 498 via interface 496. Server 340 is coupled to Dgate gateway 502 via interface 500. And server 340 is coupled to Viewgate gateway 506 via interface 504.

JGate gateway 498 is coupled to pathway connector 510, HTP/IC connector 512 and COM API connector 514 via interface 508. Dgate gateway 502 is coupled to pathway connector 510, HTP/IC connector 512 and COM API connector 514 via interface 516. Viewgate gateway 506 is coupled to pathway connector 510, HTP/IC connector 512 and COM API connector 514 via interface 518.

Pathway connector 510 is coupled to pathway 364 via interface 520. HTP/IC connector 512 is coupled to HTP/IC 372 via interface 524. COM API connector 514 is coupled to COM API 380 via interface 528. Pathway 364, HTP/IC 372, and COM API 380 are communications programs.

The prior art system shown in FIG. 5 required 9 gateways (shown at 360, 368, 376, 384, 390, 396, 402, 408, and 414), to interface the three requesters at 332, 342 and 350, with the three communications programs at 364, 372, and 380. With this prior art system, the number of gateways required is equal to the number of requesters (3), times the number of communications programs (3), for a total of 9 required gateways.

In the preferred embodiment shown at 480, the number of software code components is reduced to the number of requesters (three requesters shown at 332, 342 and 350), plus the number of communications programs (three at 364, 372 and 380), for a total of 6 required components. These 6 components are Java gate gateway 498, Dgate gateway 502, Viewgate gateway 506, Pathway Connector 510, HTP/IC connector 512 and COM API connector 514.

It is understood that any of the gateways at 498, 502 and 506, may correspond to gateway 444 shown in FIG. 6. Furthermore, any of the connectors at 510, 512 and 514, may correspond to connector 448 shown in FIG. 6. The function and operation of the gateways and connectors have been described above in FIG. 6.

FIG. 8 is a diagram showing the informational data structure used in the present invention. The data structure is shown generally at 550.

The gateway functions discussed above in FIG. 6 use a specific data structure for input data. This data structure also provides access to environment variables, and allows the use of cookies. Therefore the data structure has three parts, which are GateInfo, ReqVars and CookieInfo. GateInfo is described below, while ReqVars is described in FIG. 9, and CookieInfo is described in FIG. 10.

With GateInfo, each time main() calls a custom function, a single parameter (Info) passes to the function. The Info parameter is pointer to an information structure having the format shown at 550.

At line 552 of the format at 550, arg is the number of arguments passed to the gateway at execution time.

At line 554, **argv is an array of pointers to the arguments passed to the gateway.

At line 556, pGate_in_ data is a pointer to data submitted from an HTML form using the POST method.

At line 58, dwGate_in_data_ len is the number of bytes of data in the Gate_in_data buffer.

At line 560, pVars is a structure which contains pointers to standard common gateway interface request variables. The ReqVars structure is discussed in FIG. 9.

At line 562, pCookies is the third part of the gateway data structure. The pCookies structure contains pointers to a defined number of possible cookies used for both input and output. The CookieInfo structure definition provides further details, and is discussed in FIG. 10.

At lines 564 and 566, with bWr_Cookies, if the gateway sets this integer variable to a non-zero value, on output the associated program extension (DLL or SO) sends a cookie to the client browser of the current session. To send the cookie, the gateway must set this flag before it calls the first Transmit() function. The gateway must also set pWr_CookieBuf to point to the cookie data.

At line 668, Resp_Control and is a field which contains a value to indicate how to process the response. Current values are as follows. First, send_response tells the gateway to send a response. This is the normal case in which HTML data is sent to the browser. Here send_response is the default value. Second, req_auth indicates that the gateway requests authentication. Finally, pass_thru indicates to the web server that even though control is passed to the gateway, the request should be passed through to the next service. This is applicable only to the Netscape family of web servers. When a value of req_auth or pass-thru is used, any data that the gateway may have set up is ignored by the DLL or SO, and is not sent to the browser.

At line 570, Resp_ContentType is a required field that contains the content type for the response. This field can contain ASCII text only (for example, "text/html"). The gateway must set this field prior to the first Transmit().

The line at 572 indicates pTmp_User1, and the line at 574 indicates pTmp_User2. These are pointers set aside for the gateway developer. They can point to data buffers that the gateway sends back to the web server through the Transmit() procedure.

At line 576, with pWr_CookieBuf, if the gateway sets bWr_Cookies to a non-zero value prior to the first call to the Transmit() function, then it must also set this to point to the character string containing the cookie to be sent back to the browser. The gateway must allocate the space for the character string. The first call to the Transmit() function will copy the cookie data to a different location, so the gateway can deallocate the space for the character string if desired. The gateway should not modify the value of pWr_CookieBuf if it is not sending a cookie.

FIG. 9 is a diagram showing the data structure used to reference data variables provided by a web server. The data structure is shown generally at 590. The pointers in this structure reference the standard common gateway interface data variables provided by the web server. It is understood that this data stricture is exemplary, as the actual contents of each variable can be varied by the web server. If the web server provides no data for a particular variable, the variable's pointer contains a null. The gateway handles all data referenced by these pointers as read only data. WebTx does not look at these pointers or their data on the return to the web servers extension (the associated DLL or SO).

Figure 10:
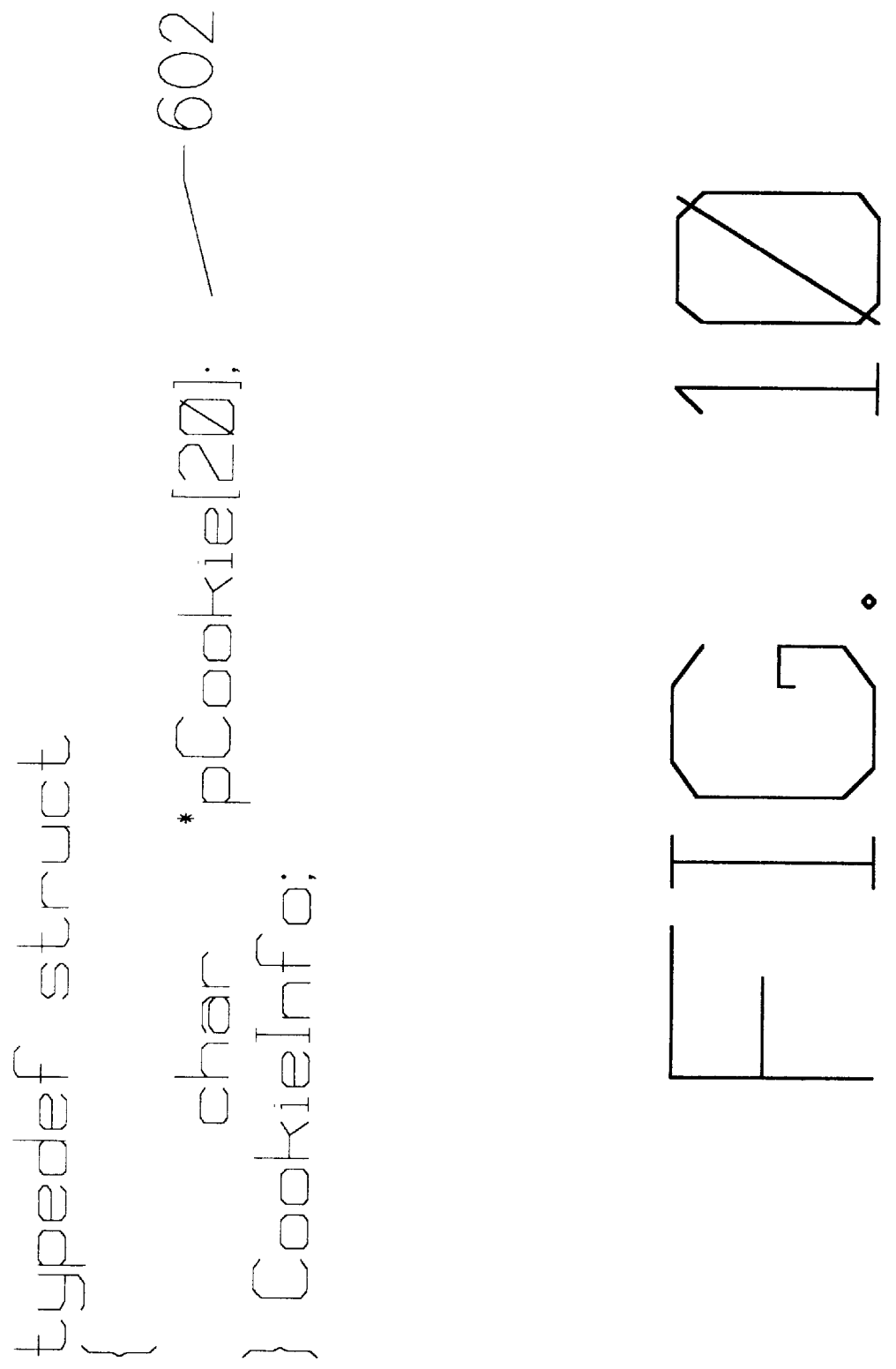

FIG. 10 is a diagram showing the data structure used to reference cookie data received by the server from the client browser. The pointers in this structure point to the cookie data received by the server from the client browser. Upon entry to the gateway, the structure contains any cookies sent from the client browser.

The line at 602 indicates *pCookie [20], which is an array of pointers to cookie data. If the gateway sets the bWr_Cookies variable to a nonzero value, and sets pWr_CookieBuf to point to cookie data prior to the first call to the Transmit() function, WebTx sends one cookie to the client browse for the current session. There is no guarantee that the client browser will accept the cookie. Thus, on input to the gateway, cookies that are expected may or may not be present. The Wr_CookieBuf should have the format of "NAME=value; expires=date; path=path; domain=domain_ name; secure". An example of this format is "PRODUCT= WebTx; path=/foo; expires =Tuesday, Mar. 25, 1997 23:00:00 GMT".

Figure 11A:
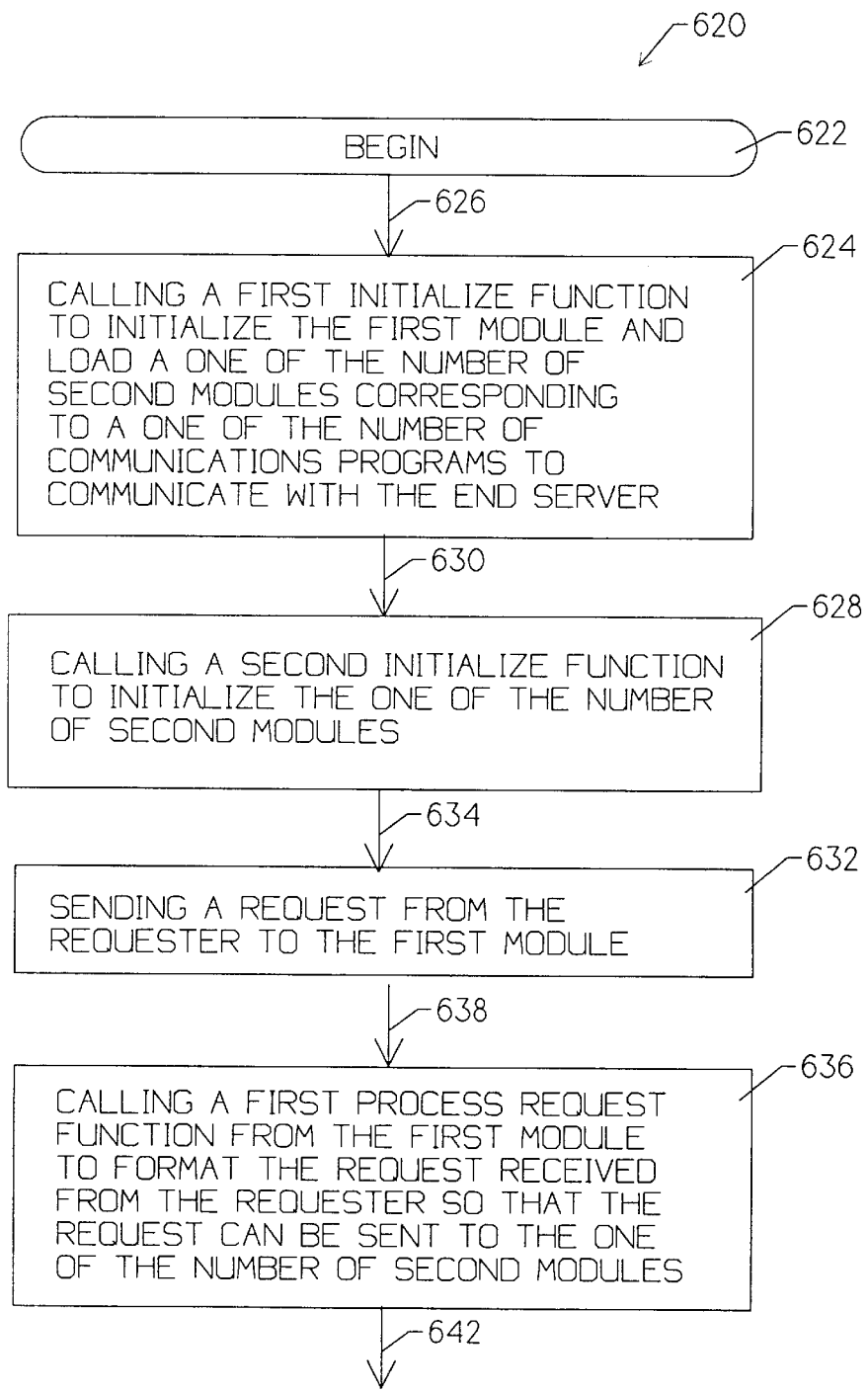
FIGS. 11A, 11B and 11C are a flow diagram showing an exemplary method of the present invention.
Figure 11B:
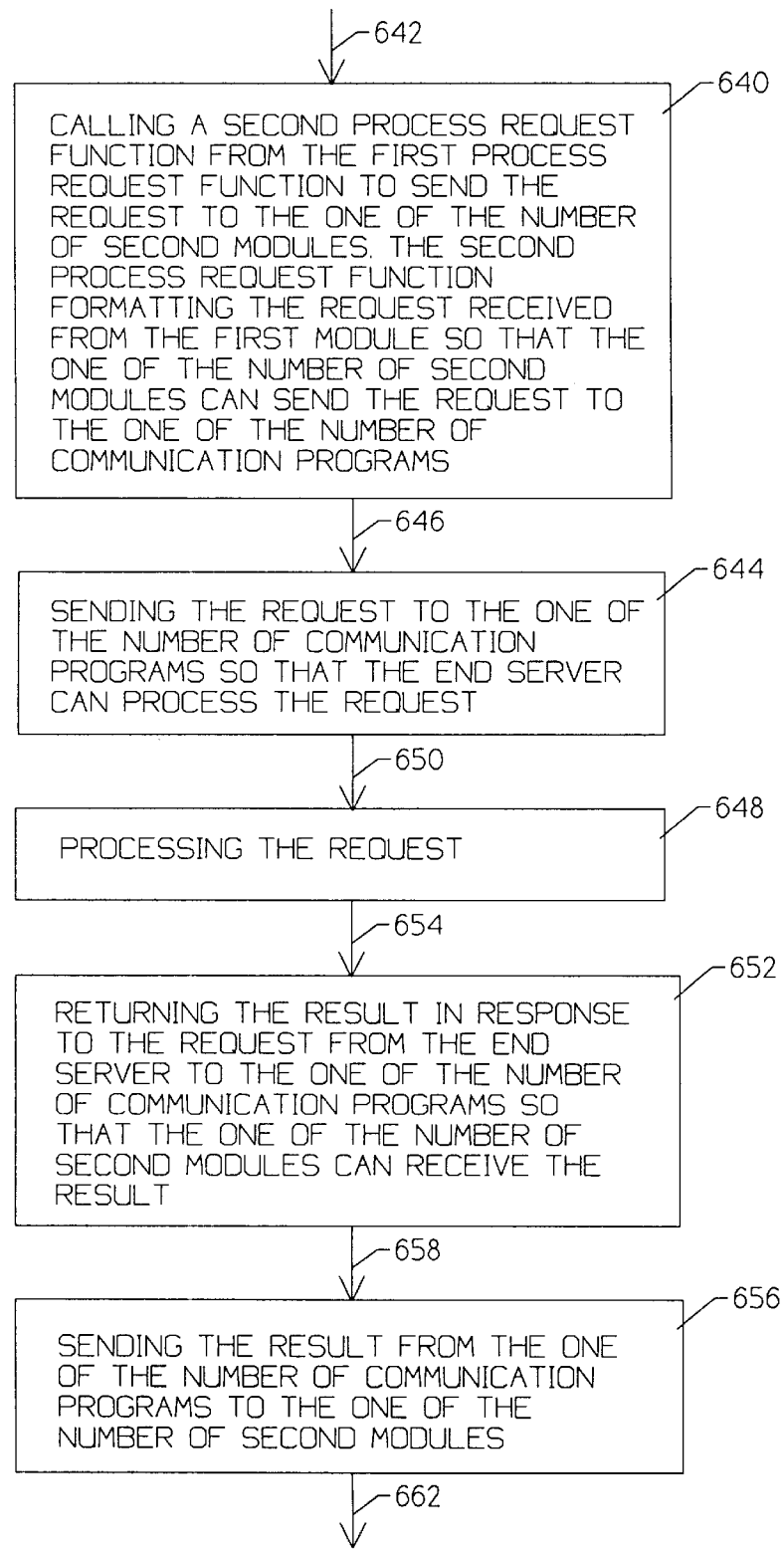
Figure 11C:
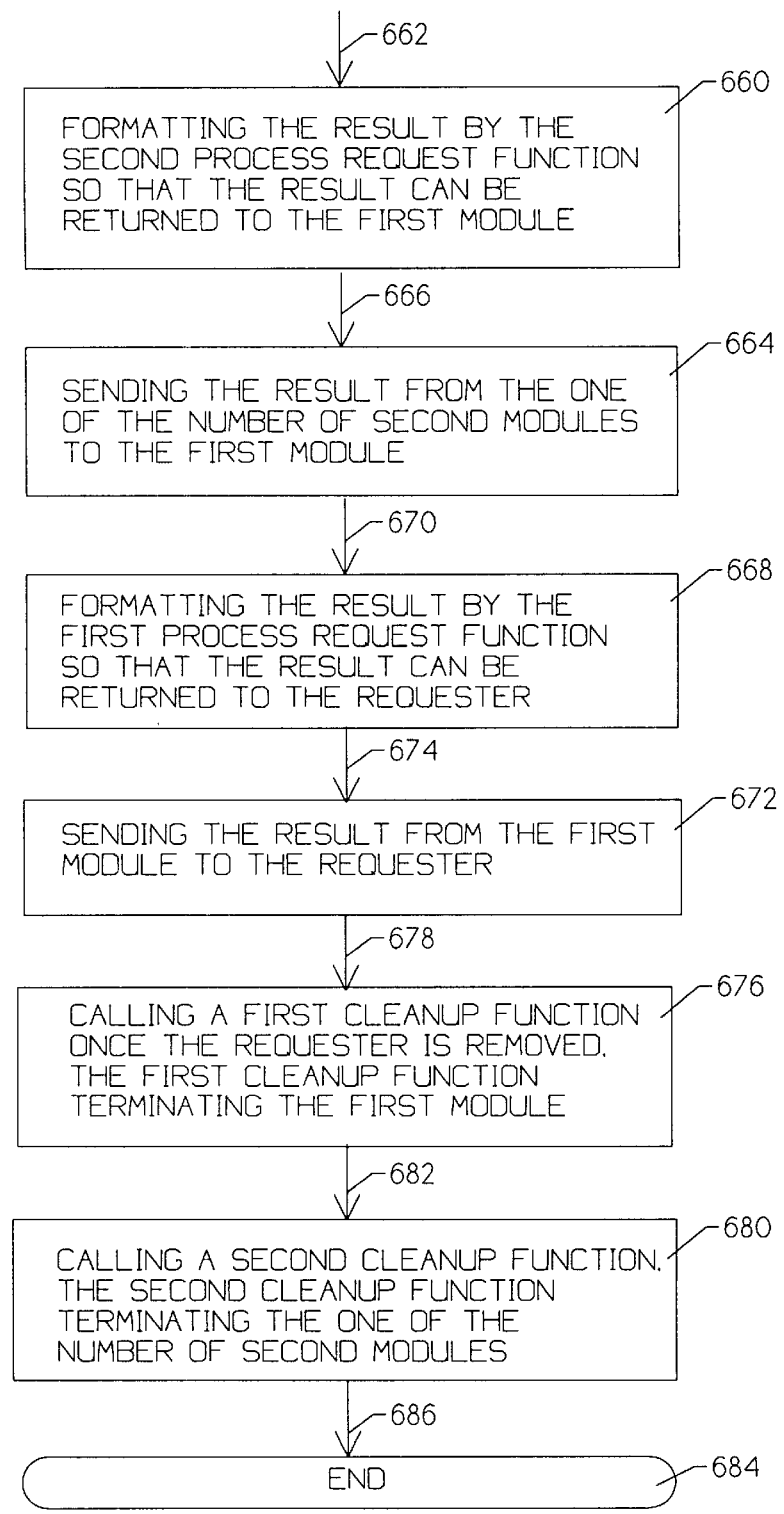

FIGS. 11A, 11B and 11C are a flow diagram showing an exemplary method of the present invention. The flow diagram communicates la request from a requester to an end server, wherein the requester is coupled to a server, and a number of communications programs are coupled to an end server. A first module is coupled to the server, and each one of a number of second modules are coupled to a corresponding one of the number of communications programs. The end server processes the request, and returns a result in response to the request.

The flow diagram is shown generally at 620. The flow diagram is entered at element 622, wherein control is passed to element 624 via interface 626. Element 624 sends a request from the requester to the first module. Control is then passed to element 628 via interface 630. Element 628 calls a first initialize function to initialize the first module and load a one of the number of second modules corresponding to a one of the number of communications programs to communicate with the end server. Element 628 may further comprise the first initialize function establishing a communications session with the second module. Element 628 may further comprise the first initialize function opening a number of application programs resident on the server. Element 628 may further comprise the first initialize function assigning memory resources on the server. Control is then passed to element 632 via interface 634. Element 632 calls a second initialize function to initialize the one of the number of second modules Element 632 may further comprise the second initialize function establishing a communications session with the one of the number of communication modules. Element 632 may further comprise the second initialize function opening a number of application programs resident on the server. Element 632 may further comprise the second initialize function assigning memory resources on the server. Control is then passed to element 636 via interface 638. Element 636 calls a first process request function from the first module to format the request received from the requester so that the request can be sent to the one of the number of second modules. Control is then passed to element 640 via interface 642. Element 640 calls a second process request function from the first process request function to send the request to the one of the number of second modules, the second process request function formatting the request received from the first module so that the one of the number of second modules can send the request to the one of the number of communication programs. Control is then passed to element 644 via interface 646. Element 644 sends the request to the one of the number of communication programs so that the end server can process the request. Control is then passed to element 648 via interface 650. Element 648 processes the request. Control is then passed to element 652 via interface 654. Element 652 returns the result in response to the request from the end server to the one of the number of communication programs so that the one of the number of second modules can receive the result. Control is then passed to element 656 via interface 658. Element 656 sends the result from the one of the number of communication programs to the one of the number of second modules. Control is then passed to element 660 via interface 662. Element 660 formats the result by the second process request function so that the result can be returned to the first module. Control is then passed to element 664 via interface 666. Element 664 sends the result from the one of the number of second modules to the first module. Control is then passed to element 668 via interface 670. Element 668 formats the result by the first process request function so that the result can be returned to the requester. Control is then passed to element 672 via interface 674. Element 672 sends the result from the first module to the requester. Control is then passed to element 676 via interface 678. Element 676 calls a first cleanup function once the requester is removed, wherein the first cleanup function terminates the first module. Control is then passed to element 680 via interface 682. Element 680 calls a second cleanup function from the first cleanup function, wherein the second cleanup function terminates the one of the number of second modules. Control is then passed to element 684 via interface 686, where the algorithm is exited.

Having thus described the preferred embodiments of the present invention, those of skill in the art will readily appreciate that the teachings found herein may be applied to yet other embodiments within the scope of the claims hereto attached.

What is claimed is:

1. A data Processing system wherein a number of requesters are coupled to a server and a number of communications programs are coupled to an end server, the end server processing a number of service requests from the number of requesters and returning a number of results in response to the number of service requests, comprising:

a. an interface coupled to the server for linking each one of the number of requesters with each one of the number of communications programs so that each one of the number of requesters can submit at least one of the number of service requests through each one of the communications programs and receive at least one of the number of results in response to said at least one of the number of service requests b. a number of first modules wherein each one of said number of first modules corresponds to one of the number of requesters; and c. a number of second modules wherein each one of said number of second modules corresponds to one of the number of communications programs, each said one of said number of first modules able to interface with every said one of said number of second modules by passing a number of function calls between each said one of said number of first modules and every said one of said number of second modules so that each one of the number of requesters can submit at least one of the number of service requests through each one of the number of communications programs and receive at least one of the number of results in response to said at least one of the number of service requests.

2. The data processing system according to claim 1 wherein one of said number of function calls is a first initialize function, said first initialize function initializing said one of said number of first modules and loading said one of said number of second modules corresponding to said one of the number of communications programs, said first initialize function making a second initialize function call to initialize said one of said number of second modules.

3. The data processing system according to claim 2 wherein said first initialize function initializes said one of said number of first modules by establishing a communications session with said one of said number of said second modules.

4. The data processing system according to claim 2 wherein said first initialize function initializes said one of said number of first modules by opening a number of application programs resident on the server.

5. The data processing system according to claim 2 wherein said first initialize function initializes said one of said number of first modules by assigning memory resources on the server.

6. The data processing system according claim 2 wherein said second initialize function initializes said one of said number of second modules.

7. The data processing system according to claim 6 wherein said second initialize function initializes said one of said number of second modules by establishing a communications session with said one of the number of communication programs.

8. The data processing system according to claim 6 wherein said second initialize function initializes said one of said number of second modules by opening a number of application programs resident on the server.

9. The data processing system according to claim 6 wherein said second initialize function initializes said one of said number of second modules by assigning memory resources on said server.

10. The data processing system according to claim 1 wherein one of said number of function calls is a first process request function, said first process request function being called by said one of said number of first modules to format said one of the number of service requests received from said one of the number of requesters for a second process request function call to said one of said number of second modules to send said one of the number of service requests to said one of said number of second modules, said first process request function formatting said one of the number of results received from said one of said number of second modules in response to said one of the number of service requests and returning said one of the number of results to said one of the number of requesters.

11. The data processing system according to claim 10 wherein said second process request function formats said one of the number of service requests received from said one of said number of first modules so that said one of said number of second modules can send said service request to said one of the number of communication programs, said second process request function formatting said one of the number of results received from the one of said number of communications programs in response to said one of the number of service requests so that said one of the number of results can be returned to said one of said number of first modules.

12. The data processing system according to claim 10 wherein one of said number of function calls is a first cleanup function, said first cleanup function terminating said one of said number of first modules, said first cleanup function calling a second cleanup function.

13. The data processing system according to claim 12 wherein said second cleanup function terminates said one of said number of second modules.

14. The data processing system according to claim 1 wherein said number of first modules are a number of gateway modules.

15. The data processing system according to claim 1 wherein said number of second modules are a number of connector modules.

16. The data processing system according to claim 2 wherein said first initialize function is an Initialize function.

17. The data processing system according to claim 6 wherein said second initialize function is a ConInitialize function.

18. The data processing system according to claim 10 wherein said first process request function is a ProcessRequest function.

19. The data Processing system according to claim 11 wherein said second process request function is a ConProcessRequest function.

20. The data processing system according to claim 12 wherein said first cleanup function is a Cleanup function.

21. The data processing system according to claim 13 wherein said second cleanup function is a ConCleanup function.

22. A data Processing system wherein a number of requesters are coupled to a server and a number of communications programs are coupled to an end server, the end server processing a number of service requests from the number of requesters and returning a number of results in response to the number of service requests, comprising:

a. first module means coupled to the server; and
b. second module means coupled to the number of communications programs, said first module means completing a number of function calls so that said first module means can communicate a one of the number of service requests received from a one of the number of requesters to the second module means and return a one of the number of results received from the second module means to said one of the number of requesters and said second module means can communicate said one of the number of service requests to a one of the number of communications programs and return the result received from said one of the number of communication programs to said first module means.

23. The data processing system according to claim 22 wherein one of said number of function calls is a first initialize function, said first initialize function initializing said first module means and loading said second module means corresponding to said one of the number of communications programs, said first initialize function making a second initialize function call to initialize said second module means.

24. The data processing system according to claim 23 wherein said first initialize function initializes said first module means by establishing a communications session with said second module means.

25. The data processing system according to claim 23 wherein said first initialize function initializes said first module means by opening a number of application programs resident on the server.

26. The data processing system according to claim 23 wherein said first initialize function initializes said first module means by assigning memory resources on the server.

27. The data processing system according claim 23 wherein said second initialize function initializes said second module means.

28. The data processing system according to claim 27 wherein said second initialize function initializes said second module means by establishing a communications session with said one of the number of communications programs.

29. The data processing system according to claim 27 wherein said second initialize function initializes said second module means by opening a number of application programs resident on the server.

30. The data processing system according to claim 27 wherein said second initialize function initializes said second first module means by assigning memory resources on the server.

31. The data processing system according to claim 22 wherein one of said number of function calls is a first process request function, said first process request function being called by said first module means to format said one of the number of service requests received from said one of the number of requesters for a second process request function call to said second module means to send said one of the number of service requests to said second module means, said first process request function formatting said one of the number of results received from said second module means in response to said one of the number of service requests and returning said one of the number of results to said one of the number of requesters.

32. The data processing system according to claim 31 wherein said second process request function formats said one of the number of service requests received from said first module means so that said second module means can send said one of the number of service requests to said one of the number of communication programs, said second process request function formatting said one of the number of results received from the one of said number of communications programs in response to said one of the number of service requests so that said one of the number of results can be returned to said first module means.

33. The data processing system according to claim 31 wherein one of said number of function calls is a first cleanup function, said first cleanup function terminating said first module means, said first cleanup function calling a second cleanup function.

34. The data processing system according to claim 33 wherein said second cleanup function terminates said second module means.

35. A method of communicating a request from a requester to an end server wherein the requester is coupled to a server and a number of communications programs are coupled to an end server, a first module being coupled to the server and each one of a number of second modules being coupled to a corresponding one of the number of communications programs, the end server processing the request and returning a result in response to the request, comprising the steps of:

a. calling a first initialize function to initialize the first module and load a one of the number of second modules corresponding to a one of the number of communications programs to communicate with the end server;

b. calling a second initialize function to initialize the one of the number of second modules;

c. sending a request from the requester to the first module;

d. calling a first process request function from the first module to format the request received from the requester so that the request can be sent to said one of the number of second modules;

e. calling a second process request function from said first process request function to send the request to said one of the number of second modules, said second process request function formatting the request received from said first module so that said one of the number of second modules can send the request to said one of the number of communication programs;

f. sending the request to said one of the number of communication programs so that the end server can process the request;

g. processing the request;

h. returning the result in response to the request from the end server to said one of the number of communication programs so that said one of the number of second modules can receive the result;

i. sending the result from said one of the number of communication programs to said one of the number of second modules;

j. formatting the result by said second process request function so that the result can be returned to the first module;

k. sensing the result from said one of the number of second modules to the first module;

l. formatting the result by said first process request function so that the result can be returned to the requester;

m. sending the result from the first module to the requester;

n. calling a first cleanup function once the requester has been removed, said first cleanup function terminating the first module; and o. calling a second cleanup function from the first cleanup function, said second cleanup function terminating said one of the number of second modules.

36. The method according to claim 35 wherein step (b) further comprises the step of said first initialize function establishing a communications session with the second module.

37. The method according to claim 35 wherein step (b) further comprises the step of said first initialize function opening a number of application programs resident on the server.

38. The method according to claim 35 wherein step (b) further comprises the step of said first initialize function assigning memory resources on the server.

39. The method according to claim 35 wherein step (c) further comprises the step of said second initialize function establishing a communications session with said one of the number of communication modules.

40. The method according to claim 35 wherein step (c) further comprises the step of said second initialize function opening a number of application programs resident on the server.

41. The method according to claim 35 wherein step (c) further comprises the step of said second initialize function assigning memory resources on the server.

* * * * *